No. 643,086. Patented Feb. 6, 1900.
J. CURLEY.
APPARATUS FOR DISTRIBUTING AIR.
(Application filed May 6, 1899.)
(No Model.)
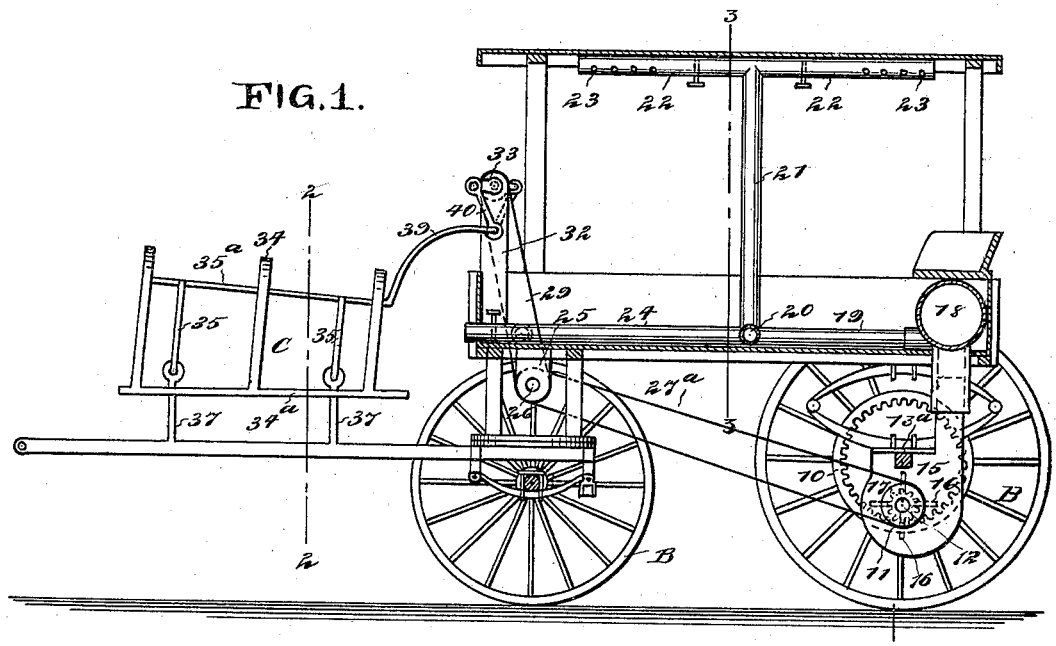
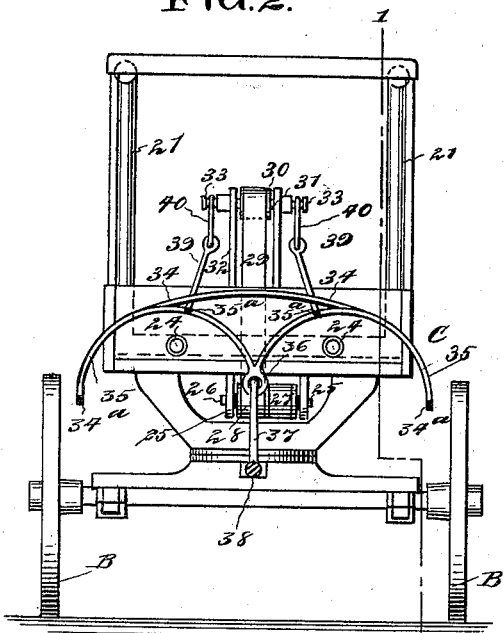
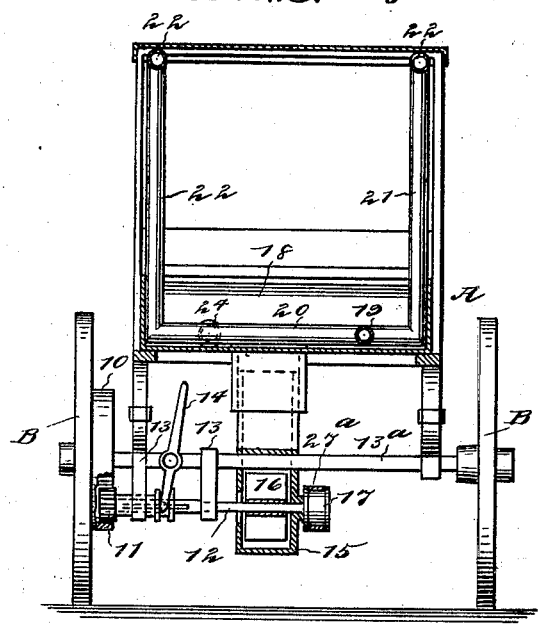
WITNESSES:
INVENTOR
James Curley
BY
ATTORNEYS

UNITED STATES PATENT OFFICE.

JAMES CURLEY, OF MACOUPIN, ILLINOIS.

APPARATUS FOR DISTRIBUTING AIR.

SPECIFICATION forming part of Letters Patent No. 643,086, dated February 6, 1900.

Application filed May 6, 1899. Serial No. 715,784. (No model.)

*To all whom it may concern:*

Be it known that I, JAMES CURLEY, of Macoupin, in the county of Macoupin and State of Illinois, have invented a new and Improved Apparatus for Distributing Air, of which the following is a full, clear, and exact description.

One object of my invention is to provide a simple and effective apparatus for distributing air adapted for application to vehicles and to so construct the apparatus that air may be drawn from a pure source and delivered directly to various points where it is required, means being provided for regulating the supply.

A further object of the invention is to provide an apparatus of the character described so constructed that when applied to a vehicle not only will the occupants of the vehicle be benefited, but also the animal or animals attached to said vehicle.

The invention consists in the novel construction and combination of the several parts, as will be hereinafter fully set forth, and pointed out in the claim.

Reference is to be had to the accompanying drawings, forming a part of this specification, in which similar characters of reference indicate corresponding parts in all the figures.

Figure 1 is a longitudinal vertical section through a vehicle having the improvement applied thereto, the section being taken practically on the line 1 1 of Fig. 2. Fig. 2 is a vertical section taken practically on the line 2 2 of Fig. 1, showing the vehicle to which the apparatus is applied in front elevation. Fig. 3 is a transverse vertical section through the vehicle and applied apparatus, the section being on the line 3 3 of Fig. 1.

A represents a vehicle of any approved construction, mounted upon suitable wheels B, and an inwardly-toothed ring-gear 10 is preferably secured to the hub of one of the rear wheels B, the teeth of the gear 10 being engaged by a pinion 11, which pinion is mounted to slide upon and yet revolve a shaft 12, said shaft being mounted in hangers 13, supported by the rear axle 13ª, as shown in Fig. 3, and the pinion 11 is provided with a suitable shifting-lever 14, whereby it may be carried into or out of gear with said driving-gear 10. The shaft 12 likewise extends through and turns in a fan-casing 15, which fan-casing is carried up to and through the bottom of the vehicle, as shown in Figs. 1 and 3, and within the casing a fan 16, of any desired type, is secured on the shaft 12, while at the inner end of the shaft 12 a pulley 17 is secured.

The fan-casing 15 is usually made to connect directly with a storage-drum 18, located in the body of the wagon, beneath the rear seat thereof, as shown best in Fig. 1. The connection between the casing 15 and drum 18 is such that the casing may slide in an extension from the drum, so that said connection will not be affected by the movement of the body of the vehicle. A supply-pipe 19 is carried from said storage-drum to a connection with a cross-pipe 20, located at the bottom of the body of the vehicle, near its center, and the ends of the cross-pipe 20 are connected with upright pipes 21, and these upright pipes at their upper ends are connected with branch pipes 22, and said branch pipes are closed at their ends and provided with apertures 23, particularly upon their inner faces. The apertured portions of the pipes are usually in the near vicinity of the sides of the vehicle, so that the currents of air created by the fan will be directed from each side of the vehicle toward the center, enabling the supply of air to be enjoyed by all the occupants of the vehicle no matter where seated. Other pipes 24 connect with the cross-pipe 20, and these pipes 24 extend out through the front board of the vehicle-body at the rear of the team and serve to keep the team cool and in good condition while traveling.

It will be understood that all the pipes are provided with suitable valves, so that the supply of air to any particular pipe or pipes may be turned on or cut off, as occasion may demand.

Hangers 25 are projected downward from the bottom of the vehicle-body, at its front, as shown best in Fig. 2, and in these hangers a shaft 26 is journaled, having attached thereto two pulleys 27 and 28, the pulley 27 having a belt connection 27ª with the pulley 17 on the driven shaft 12. The pulley 28 is connected by a belt 29 with a pulley 30, the latter pulley being mounted on the shaft 31, journaled in uprights 32 at the front of the body and extending above the dashboard thereof, and the shaft 31 is provided at each end with a crank-arm 33, as is shown best in Figs. 1 and 2.

In order that the animals attached to the vehicle may be protected from the annoyance of flies or other insects and also that their bodies may be kept as cool as possible, I provide a fanning-frame C. This fanning-frame consists of a series of arched bars 34, connected at their bottoms by side bars 34ª, as shown in Fig. 1, and between the arched bars of the fanning-frame series of arched braces 35 are arranged in pairs and connected with said bars 34, the braces of each pair meeting at the central longitudinal portion of the frame, being connected by an eye 36, and the longitudinally-alining braces 35 are connected near their upper portions by cross-bars 35ª, as shown in Figs. 1 and 2. The eyes 36 of the braces 35 have a pivotal connection with uprights 37, attached to the tongue or pole 38, so that the fanning-frame is capable of a laterally-rocking movement, and this frame may be covered with gauze and may be provided with pendants adapted to act as fans, the gauze and pendants not being shown in the drawings. Arms 39 are projected upwardly and in direction of the longitudinal center of the fanning-frame, and these arms 39 are connected by links 40 with the crank-arms 33ª of the shaft 31, as shown in Figs. 1 and 2, and said crank-shaft imparts to the fanning-frame its rocking movement.

Thus it will be observed that when the vehicle is occupied, as above described, currents of fresh air will be supplied not only to the occupants of the vehicle, but also to the animals drawing said vehicle, and at the same time the bodies of the animals are protected from the irritation of insects or objects floating in the air.

The device can be applied with great advantage to passenger-coaches, street-cars, and other vehicles of similar type.

Having thus described my invention, I claim as new and desire to secure by Letters Patent—

The combination, with the body and running-gear of a vehicle, a gear secured to a supporting-wheel of the running-gear, a shaft driven from the said gear, a fan-casing in which a portion of the shaft is journaled, and a fan located on said shaft within the casing, of a reservoir on the body of the vehicle, a supply-pipe extending from the reservoir and having a sliding connection with the fan-casing, pipes connected with the reservoir and extending along the bottom of the vehicle-body out through the dashboard, the outer ends of the pipes being open, whereby a current of air is secured to the team, upright pipes likewise connected with the reservoir, and lateral branches at the upper portion of the upright pipes, which lateral branches are closed at their ends and provided with valves and with apertures in their inner faces, as and for the purpose specified.

JAMES CURLEY.

Witnesses:
  THOMAS E. MOORE,
  WILLIAM H. STEWARD.